United States Patent
Ishii et al.

(10) Patent No.: US 12,070,802 B2
(45) Date of Patent: Aug. 27, 2024

(54) SINTERED MATERIAL AND CUTTING TOOL INCLUDING SAME

(71) Applicant: SUMITOMO ELECTRIC INDUSTRIES, LTD., Osaka (JP)

(72) Inventors: Akito Ishii, Hyogo (JP); Takashi Harada, Hyogo (JP); Katsumi Okamura, Hyogo (JP); Satoru Kukino, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1084 days.

(21) Appl. No.: 16/339,557

(22) PCT Filed: Jul. 10, 2017

(86) PCT No.: PCT/JP2017/025155
§ 371 (c)(1),
(2) Date: Apr. 4, 2019

(87) PCT Pub. No.: WO2018/074017
PCT Pub. Date: Apr. 26, 2018

(65) Prior Publication Data
US 2019/0240739 A1 Aug. 8, 2019

(30) Foreign Application Priority Data
Oct. 17, 2016 (JP) .................. 2016-203467

(51) Int. Cl.
| B32B 27/14 | (2006.01) |
| B23B 27/14 | (2006.01) |
| C04B 35/119 | (2006.01) |
| C04B 35/488 | (2006.01) |
| C04B 35/50 | (2006.01) |
| C04B 35/505 | (2006.01) |
| C04B 35/56 | (2006.01) |
| C04B 35/58 | (2006.01) |

(52) U.S. Cl.
CPC ............ *B23B 27/14* (2013.01); *C04B 35/119* (2013.01); *C04B 35/488* (2013.01); *C04B 35/4885* (2013.01); *C04B 35/50* (2013.01); *C04B 35/505* (2013.01); *C04B 35/56* (2013.01); *C04B 35/58* (2013.01)

(58) Field of Classification Search
CPC ... B23B 27/14; C04B 35/119; C04B 35/4885; C04B 35/505; C04B 35/56; C04B 35/58; C04B 35/5607–5626; C04B 35/58007–580035; C04B 35/587; C04B 35/565
See application file for complete search history.

(56) References Cited

U.S. PATENT DOCUMENTS 4,769,350 A * 9/1988 Nishioka ............... C04B 35/584
501/97.4

FOREIGN PATENT DOCUMENTS

| CN | 101767989 A * | 7/2010 | |
| CN | 101767989 A | 7/2010 | |
| EP | 1116703 A1 * | 7/2001 | ........... C04B 35/117 |
| EP | 1116703 A1 | 7/2001 | |
| EP | 3153485 A1 | 4/2017 | |
| EP | 3156384 A1 | 4/2017 | |
| EP | 3162780 A1 | 5/2017 | |
| EP | 3466907 A1 | 4/2019 | |
| JP | S63-252965 A | 10/1988 | |
| JP | 2001-019537 A | 1/2001 | |

OTHER PUBLICATIONS

CN101767989 machine translation (Year: 2010).*
Wikipedia article titled "Zirconium Dioxide" (Year: 2022).*
Wikipedia article titled "Aluminum Oxide" (Year: 2022).*
Wikipedia article titled "Titanium Carbide" (Year: 2022).*

* cited by examiner

*Primary Examiner* — Bryan D. Ripa
*Assistant Examiner* — Cameron K Miller
(74) *Attorney, Agent, or Firm* — McCarter & English, LLP; Michael A. Sartori

(57) ABSTRACT

A sintered material includes a first material and a second material, wherein the first material is partially stabilized $ZrO_2$ in which 1 to 90 volume % of $Al_2O_3$ is dispersed in crystal grain boundaries or crystal grains, the $Al_2O_3$ is a grain having a grain size of less than or equal to 1 μm, and the second material is at least one compound selected from a group consisting of a carbide, a nitride, and a carbonitride, and 5 to 95 volume % of the second material is included in the sintered material.

6 Claims, No Drawings

SINTERED MATERIAL AND CUTTING TOOL INCLUDING SAME

TECHNICAL FIELD

The present invention relates to a sintered material and a cutting tool including the sintered material. The present application claims a priority based on Japanese Patent Application No. 2016-203467 filed on Oct. 17, 2016, the entire content of which is incorporated herein by reference.

BACKGROUND ART

For example, as disclosed in Japanese Patent Laying-Open No. 2001-019537 (Patent Literature 1), there has been known a sintered material (so-called "black ceramic") including: one of a carbide, a nitride, a carbonitride, each of which includes at least one of Ti, Zr, Nb, and Ta, and tungsten carbide; $Al_2O_3$; and a Zr compound. A cutting tool employing such a sintered material has an excellent wear resistance, and is used for cutting of hardened steel, gray iron, and the like.

CITATION LIST

Patent Literature

PTL 1: Japanese Patent Laying-Open No. 2001-019537

SUMMARY OF INVENTION

A sintered material according to one embodiment of the present disclosure includes a first material and a second material, wherein the first material is partially stabilized $ZrO_2$ in which 1 to 90 volume % of $Al_2O_3$ is dispersed in crystal grain boundaries or crystal grains, the $Al_2O_3$ is a grain having a grain size of less than or equal to 1 μm, and the second material is at least one compound selected from a group consisting of a carbide, a nitride, and a carbonitride, and 5 to 95 volume % of the second material is included in the sintered material.

Further, a cutting tool according to one embodiment of the present disclosure includes the above-described sintered material.

DETAILED DESCRIPTION

Problems to be Solved by the Present Disclosure

It has been pointed out that the sintered material disclosed in Patent Literature 1 is chipped during cutting because respective toughnesses of TiC and $Al_2O_3$ included therein are low.

In view of the above, the present disclosure has an object to provide: a sintered material including at least one of a carbide, a nitride, and a carbonitride and having an excellent chipping resistance; and a cutting tool including the sintered material.

Advantageous Effect of the Present Disclosure

According to the description above, there can be provided: a sintered material including at least one of a carbide, a nitride, and a carbonitride and having an excellent chipping resistance; and a cutting tool including the sintered material.

DESCRIPTION OF EMBODIMENTS

First, embodiments of the present invention are listed and described.

[1] A sintered material according to one embodiment of the present disclosure includes a first material and a second material, wherein the first material is partially stabilized $ZrO_2$ in which 1 to 90 volume % of $Al_2O_3$ is dispersed in crystal grain boundaries or crystal grains, the $Al_2O_3$ is a grain having a grain size of less than or equal to 1 μm, and the second material is at least one compound selected from a group consisting of a carbide, a nitride, and a carbonitride, and 5 to 95 volume % of the second material is included in the sintered material. With such a configuration, the sintered material can have an excellent chipping resistance.

[2] Preferably, the compound includes at least one element selected from a group consisting of a group 4 element, a group 5 element, a group 6 element, and Si in a periodic table. Accordingly, the sintered material can have a more excellent chipping resistance.

[3] Preferably, a volume ratio, $ZrO_2/(ZrO_2+Al_2O_3)$, in the first material is more than or equal to 0.49. Accordingly, the sintered material can have a further excellent chipping resistance.

[4] Preferably, the sintered material further includes a third phase, the third phase includes at least one selected from a group consisting of aluminum oxide, magnesium oxide, cerium oxide, yttrium oxide, and hafnium oxide, and less than or equal to 95 volume % of the third phase is included in the sintered material. Accordingly, the sintered material can have an excellent wear resistance.

[5] A cutting tool according to one embodiment of the present disclosure includes the above-described sintered material. With such a configuration, the cutting tool can have an excellent chipping resistance.

Details of Embodiments of the Present Invention

The following describes an embodiment (hereinafter, also referred to as "the present embodiment") of the present invention more in detail.

Here, in the present specification, the expression "A to B" represents a range of lower to upper limits (i.e., more than or equal to A and less than or equal to B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio is not necessarily limited only to one in the stoichiometric range. In the present embodiment, a metallic element and a nonmetallic element does not necessarily need to constitute a stoichiometric composition. Examples of the metallic element include titanium (Ti), aluminum (Al), silicon (Si), tantalum (Ta), or chromium (Cr). Examples of the nonmetallic element include nitrogen (N), oxygen (O), and carbon (C). The term "grain size" or "particle size" in the present specification means an average grain size or average particle size unless otherwise particularly stated.

<<Sintered Material>>

Conventionally, it has been known that when used as a cutting tool, a sintered material including at least one of a carbide, a nitride, and a carbonitride, $Al_2O_3$, and a Zr compound has an excellent wear resistance in high-speed cutting of centrifugal cast iron. However, since $Al_2O_3$ is a low-toughness material, the sintered material may be chipped when used for high-speed long-distance cutting.

On the other hand, according to researches of the present inventors, a high-toughness material has been obtained in the following manner: $Al_2O_3$ is finely precipitated (more than or equal to 0.1 μm) in $ZrO_2$ grains or $ZrO_2$ grain boundaries in a partially stabilized $ZrO_2$ sintered material that is produced through a neutralization co-precipitation method or a sol-gel method, a HIP method or a SPS (pulse electric current) sintering method, and that has $Al_2O_3$ dissolved in a solid state.

Further, the present inventors have completed the present invention by obtaining the following knowledge: chipping resistance is improved significantly when fine $Al_2O_3$ is included and presented in a specific form within a sintered material including partially stabilized $ZrO_2$ serving as a high-toughness material and at least one of a carbide, a nitride, and a carbonitride. The chipping resistance is improved significantly presumably due to the following reason: the structure of the partially stabilized $ZrO_2$ becomes tough due to the finely precipitated $Al_2O_3$, thus resulting in a synergistic effect of the resultant toughness and intrinsic characteristics of the carbide, the nitride, and the carbonitride. Such a sintered material also has an excellent wear resistance.

A sintered material according to the present embodiment is a sintered material including a first material and a second material. The first material is partially stabilized $ZrO_2$ in which 1 to 90 volume % of $Al_2O_3$ is dispersed in crystal grain boundaries or crystal grains. The $Al_2O_3$ is a grain having a grain size of less than or equal to 1 μm. The second material is at least one compound selected from a group consisting of a carbide, a nitride, and a carbonitride, and 5 to 95 volume % of the second material is included in the sintered material.

Such a sintered material according to the present embodiment may include any other component(s) as long as the sintered material includes the first material and the second material. Examples of the other component(s) can include, but should not be limited only to, a third phase and the like as described below. Moreover, such a sintered material may include an inevitable impurity as long as the sintered material exhibits a desired effect. As a matter of course, the sintered material can include only both the first material and the second material. The following describes each of the components of such a sintered material.

<First Material>

The first material is partially stabilized $ZrO_2$ in which 1 to 90 volume % of $Al_2O_3$ is dispersed in crystal grain boundaries or crystal grains of the partially stabilized $ZrO_2$. The $Al_2O_3$ is a grain having a grain size of less than or equal to 1 μm.

The term "partially stabilized $ZrO_2$" has the conventionally known meaning, and refers to $ZrO_2$ in which cubic and tetragonal crystals are stable or metastable at a room temperature.

Examples of an oxide other than $ZrO_2$ and $Al_2O_3$ include: calcium oxide; magnesium oxide; and a rare earth oxide such as yttrium oxide. The partially stabilized $ZrO_2$ can include one or two or more of the above-described oxides. An amount of solid solution of the oxide(s) other than $ZrO_2$ and $Al_2O_3$ is preferably about 1 to 4 mol % relative to $ZrO_2$.

The partially stabilized $ZrO_2$ includes 1 to 90 volume % of $Al_2O_3$ with respect to the partially stabilized $ZrO_2$. More preferably, 1 to 51 volume % of $Al_2O_3$ with respect to the partially stabilized $ZrO_2$ is included therein. Accordingly, characteristics, such as high hardness, high strength, and high toughness, are obtained, whereby a difficult-to-cut steel material can be cut in high speed. When the content of $Al_2O_3$ is less than 1 volume %, the above-described characteristics cannot be obtained, with the result that the chipping resistance is decreased. When the content of $Al_2O_3$ is more than 90 volume %, the toughness is decreased significantly.

$Al_2O_3$ is present in a manner of being dispersed in the crystal grain boundaries or crystal grains of the partially stabilized $ZrO_2$. Namely, the expression "present in a manner of being dispersed" means that fine-grained $Al_2O_3$ is precipitated to be dispersed in the crystal grain boundaries or the crystal grains. Hence, $Al_2O_3$ needs to be grains (crystal grains) each having a grain size of less than or equal to 1 μm. When the grain size of $Al_2O_3$ is more than 1 μm, the hardness and the toughness are decreased. $Al_2O_3$ is preferably a grain having a grain size of less than or equal to 0.5 μm, and is more preferably a grain having a grain size of less than or equal to 0.1 μm. As the grain size is smaller, the toughness tends to be improved, so that the lower limit of the grain size should not be limited. However, when the grains are too fine, the toughness of the material itself tends to be decreased. Hence, the grain size of $Al_2O_3$ is preferably more than or equal to 0.005 μm.

Here, the grain size of $Al_2O_3$ is changed depending on sintering conditions. Moreover, even under the same sintering conditions, the grain size of $Al_2O_3$ varies between the case of sintering only the first material and the case of mixing and sintering the first material and the second material described below. Namely, comparing the grain size of $Al_2O_3$ in the case of sintering only the first material with the grain size of $Al_2O_3$ in the case of mixing and sintering the first material and the second material, the latter grain size (i.e., the grain size of $Al_2O_3$ in the sintered material including the second material) tends to be a fine grain size (crystal grain size) that is approximately one tenth as small as the former grain size (i.e., the grain size of $Al_2O_3$ in the case of only the first material), even when the same sintering conditions (such as temperature and pressure) are applied. This is presumably due to the following reason: since the first material and the second material are combined to suppress crystal grain growth of $Al_2O_3$, the grain size of $Al_2O_3$ becomes finer.

Therefore, the phenomenon in which the grain size (crystal grain size) of $Al_2O_3$ becomes less than or equal to 0.1 μm is a specific phenomenon that appears when the first material and the second material are mixed and sintered. When the second material is not included, the grain size of $Al_2O_3$ does not become less than or equal to 0.1 μm (normally, the grain size is more than 0.2 μm).

In the sintered material according to the present embodiment, the toughness is improved significantly because $Al_2O_3$ is finely dispersed in the partially stabilized $ZrO_2$ as described above. This is presumably due to the structure being tough by $Al_2O_3$. In addition, $Al_2O_3$ can be present in either or both of the crystal grain boundaries and the crystal grains. Namely, a position of presence of $Al_2O_3$ is not limited to a particular position of the partially stabilized $ZrO_2$.

The grain size, content (volume) and position of presence of $Al_2O_3$ can be determined in accordance with the following method. Specifically, the sintered material is subjected to a CP (Cross Section Polisher) process using an ion beam, thereby forming a smooth cross section. Next, the cross section is observed using a scanning electron microscope (SEM), thereby specifying the position of presence of $Al_2O_3$. Based on the microscope image obtained by this SEM, a binarization process is performed using image analysis software and the equivalent circle diameter and area of $Al_2O_3$ are calculated. The equivalent circle diameter can be regarded as the grain size. Moreover, the area can be regarded as a volume, and therefore can be regarded as the content of $Al_2O_3$. In the present specification, the term "equivalent circle diameter" refers to the diameter of an imaginary circle having an area comparable to the area of the measurement object calculated by a binarization process employing image analysis software.

The grain size (equivalent circle diameter) of $Al_2O_3$ is an average grain size. This average grain size can be calculated as follows: a total of ten microscope images are captured from positions in which $Al_2O_3$ is present; these microscope images are subjected to a binarization process employing image analysis software to calculate 50 equivalent circle diameters of $Al_2O_3$ from each of the microscope images (therefore, a total of 500 equivalent circle diameters of $Al_2O_3$ are calculated by 10 microscope images×50 equivalent circle diameters); and the average value thereof is calculated. Likewise, the content (volume) of $Al_2O_3$ can be calculated as an average value of 500 areas of $Al_2O_3$ calculated from 10 microscope images.

Here, a volume ratio, $ZrO_2/(ZrO_2+Al_2O_3)$, in the first material is preferably more than or equal to 0.49. $ZrO_2/(ZrO_2+Al_2O_3)$ is an index indicating the chipping resistance. As the value thereof is larger, the chipping resistance is more improved. Since $ZrO_2/(ZrO_2+Al_2O_3)$ is more than or equal to 0.49, the chipping resistance of the sintered material can be particularly improved. This is presumably due to the following reason: with the above-described volume ratio in the first material, a ratio of $Al_2O_3$ finely precipitated in the crystal grain boundaries or crystal grains of the partially stabilized $ZrO_2$ is optimized, whereby the structure of the partially stabilized $ZrO_2$ becomes tougher. Although the upper limit value of the volume ratio, $ZrO_2/(ZrO_2+Al_2O_3)$, does not need to be defined particularly, it is preferable to set the upper limit value at a value, such as 0.99, at which an amount of aluminum oxide does not become too small.

The volume of $ZrO_2$ in the first material can be determined by the same method as the method for measuring the volume of $Al_2O_3$, i.e., can be determined in the following manner: the area thereof is measured by using image analysis software to perform a binarization process onto a reflected electron image obtained through measurement of a CP-processed surface with a scanning electron microscope (SEM); and this area is converted into a volume. Therefore, the volume ratio, $ZrO_2/(ZrO_2+Al_2O_3)$, can be calculated by the following method. First, the sintered material is subjected to a CP process using an ion beam, thereby forming a smooth cross section. The cross section is observed using a scanning electron microscope (SEM) to obtain a reflected electron image. This reflected electron image is subjected to a binarization process using image analysis software so as to measure respective areas of $ZrO_2$ and $Al_2O_3$. The areas are then converted into volumes.

For example, the first material can be obtained using a below-described neutralization co-precipitation method or sol-gel method.

(Neutralization Co-Precipitation Method)

The neutralization co-precipitation method is a method including the following steps A and B. Such a method is described in a paper (J. Jpn. Soc. Powder Powder Metallurgy, Vol. 60, No. 10, P428-435) published in 2013, for example.

Step A is a step of mixing a zirconium salt, a yttrium salt and an aluminum salt such that a volume ratio between zirconia ($ZrO_2$) and yttria ($Y_2O_3$) is 98.2:1.8 to 98.8:1.2 and a volume ratio between yttria-added zirconia and alumina ($Al_2O_3$) is 10:90 to 99:1, to thereby prepare a mixed solution. Here, yttria ($Y_2O_3$) is illustrated as an oxide dissolved in a solid state in zirconia ($ZrO_2$); however, the oxide is not limited only to this.

Step B is a step of adding alkali to the mixed solution obtained in step A above for neutralization, and co-precipitating zirconium, yttrium and aluminum, to thereby obtain a precipitate, and drying the precipitate, and thereafter, performing heat treatment at 650 to 750° C. for 7 to 12 hours and performing calcination at 850 to 950° C. for 0.5 to 3 hours, to thereby prepare $Y_2O_3$ stabilized $ZrO_2$—$Al_2O_3$ solid solution powder.

Examples of the zirconium salt in step A include: zirconium oxychloride ($ZrOCl_2$), zirconium oxynitrate ($ZrO(NO_3)_2$), and the like. Examples of the yttrium salt include yttrium chloride ($YCl_3$), yttrium nitrate ($Y(NO_3)_3$), and the like. Examples of the aluminum salt include aluminum chloride ($AlCl_3$) and the like. Examples of a solvent for the mixed solution include nitric acid, hydrochloric acid, and the like.

(Sol-Gel Method)

The sol-gel method is a method including the following step X. Such a method is, for example, described in a paper (J. Jpn. Soc. Powder Powder Metallurgy, Vol. 58, No. 12, P727-732) published in 2011.

Step X is a step of preparing an amorphous solid solution powder composed of 5 to 90 mol % of $Al_2O_3$ and $ZrO_2$ having 0.3 to 1.7 mol % of $Y_2O_3$ added thereto (99.7 to 98.3 mol % of $ZrO_2$— 0.3 to 1.7 mol % of $Y_2O_3$) by using the sol-gel method, and calcining the obtained amorphous solid solution powder at a temperature equal to or higher than a crystallization temperature, to thereby prepare a crystalline, partially stabilized $ZrO_2$ solid solution powder.

(Other Methods)

The first material of the present embodiment can also be obtained by a method other than the above-described two methods. That is, partially stabilized $ZrO_2$ and $Al_2O_3$ are mixed with each other in a solvent such as ethanol using a grinder such as a bead mill or a ball mill, thereby obtaining a slurry. Then, granulation is performed using this slurry, and the first material can thus be obtained. Granulation means should not be particularly limited, and examples thereof include melt granulation or spray granulation.

The strength of the granulated material (first material) obtained by the above method can be improved by the following method:
(1) performing sintering in a heat treatment furnace (for example, at 1000° C. in vacuum for 3 hours); or
(2) adding 10 mass % of a binder (a general binder such as PVB (polyvinyl butyral)) to the slurry, which is in a stage prior to the granulated material.

As described above, the first material can be obtained by various methods and a method for manufacturing the first material should not be particularly limited.

5 to 95 volume % of the first material is preferably included in the sintered material. When the ratio of the first material in the sintered material is less than 5 volume %, the wear resistance and the chipping resistance may be decreased. When the ratio of the first material in the sintered material is more than 95 volume %, the hardness may be decreased and thus the wear resistance may be decreased. The ratio of the first material in the sintered material is more preferably 10 to 90 volume %.

Preferably, the first material has an average grain size of 0.01 μm to 1 μm. When the average grain size is smaller than 0.01 µm, aggregation is likely to occur during mixing with other powders, and thus, poor sintering tends to occur. When the average grain size exceeds 1 µm, the strength tends to decrease due to grain growth during sintering. The average grain size is more preferably 0.1 to 0.5 µm.

The average grain size of the first material can be determined by the same method as the method for determining the grain size of $Al_2O_3$. Specifically, the CP process is performed on the sintered material with an ion beam, to thereby form a smooth cross section. Then, the cross section is observed with the scanning electron microscope (SEM). By a binarization process with the image analysis software, an equivalent circle diameter of the first material is calculated, and this equivalent circle diameter can be defined as the average particle size.

Further, the compositions and contents (volumes) of the components of the sintered material of the present embodiment, in addition to this first material, can be determined by a reflected electron image obtained by measuring the CP-processed surface with the scanning electron microscope (SEM), EDX (energy dispersive X-ray analysis), or Auger electron spectroscopy analysis.

For example, the volume of the first material can be determined by the same method as the method for measuring each of the volumes of $ZrO_2$ and $Al_2O_3$, i.e., can be determined by measuring the area of the first material by using image analysis software to perform a binarization process onto a reflected electron image obtained through measurement of a CP-processed surface with a scanning electron microscope (SEM).

<Second Material>

As described above, the sintered material according to the present embodiment includes the first material and the second material. The second material is at least one compound selected from a group consisting of a carbide, a nitride, and a carbonitride, and 5 to 95 volume % of the second material is included in the sintered material.

That is, the second material is preferably included in the sintered material at a ratio of 5 to 95 volume %. When the ratio of the second material in the sintered material is less than 5 volume %, the hardness may be decreased to result in a decreased wear resistance. When the ratio of the second material in the sintered material becomes more than 95 volume %, the chipping resistance may be decreased. The content of the second material in the sintered material is more preferably 10 to 90 volume %. The content of the second material can be determined by the same measurement method as the method for measuring the content of the first material.

The above-described compound serving as the second material is preferably at least one element selected from a group consisting of a group 4 element, a group 5 element, a group 6 element in the periodic table, and Si. That is, the above-described compound is preferably one of a carbide, a nitride and a carbonitride each including at least one element selected from a group consisting of a group 4 element (Ti, Zr, Hf, or the like), a group 5 elements (V, Nb, Ta, or the like), a group 6 element (Cr, Mo, W, or the like) in the periodic table, and Si. Accordingly, the sintered material according to the present embodiment can have a more excellent chipping resistance.

Specific examples of the carbide serving as the second material can include TiC, ZrC, HfC, NbC, TaC, SiC, $Mo_2C$, WC, and the like. Examples of the nitride can include TiN, ZrN, HfN, NbN, TaN, $Si_3N_4$, CrN, and the like. Examples of the carbonitride can include TiCN, ZrCN, HfCN, NbCN, TaCN, and the like.

<Third Phase>

The sintered material according to the present embodiment can further include the third phase. The third phase is preferably at least one selected from a group consisting of aluminum oxide, magnesium oxide, cerium oxide, yttrium oxide, and hafnium oxide. Further, less than or equal to 95 volume % of the third phase is preferably included in the sintered material.

Sinterability of the sintered material according to the present embodiment is improved when the sintered material contains, as the third phase, less than or equal to 95 volume % of at least one selected from the group consisting of aluminum oxide, magnesium oxide, cerium oxide, yttrium oxide, and hafnium oxide. Accordingly, an excellent wear resistance can be obtained while achieving the effect in which the structure of the partially stabilized $ZrO_2$ becomes tough due to finely precipitated $Al_2O_3$. The content of the third phase is more preferably 0 to 60 volume %.

The third phase preferably has an average grain size of 0.05 to 5 µm. When the average grain size is less than 0.05 µm, poor sintering tends to occur due to aggregation when mixed with other powders. When the average grain size is more than 5 µm, the strength tends to be decreased due to grain growth during sintering.

The average grain size of the third phase can be determined by the same measurement method as the method for measuring the grain size of each of $Al_2O_3$ and the first material. Further, the content of the third phase can be also determined by the same measurement method as the method for measuring the content of the first material.

<Function>

According to the above, in the sintered material according to the present embodiment, the structure of the partially stabilized $ZrO_2$ serving as the first material becomes tough by $Al_2O_3$ dispersed and finely precipitated in the crystal grain boundaries or crystal grains. The chipping resistance can be improved significantly by the synergistic effect of the characteristics of such a first material and the intrinsic characteristics of the carbide, nitride, or carbonitride, each of which serves as the second material. Further, the sintered material according to the present embodiment can also have an excellent wear resistance.

<<Method for Manufacturing Sintered Material>>

The sintered material according to the present embodiment can be manufactured by a conventionally known manufacturing method, and the manufacturing method should not be particularly limited.

For example, the first material, the second material and the other component(s) (such as particles of the third phase) are mixed as raw materials using a bead mill, a ball mill or the like. Next, sintering is performed for 10 minutes to 60 minutes at a temperature of 1300° C. to 1600° C. and a pressure of 10 MPa to 7 GPa, thereby obtaining the sintered material. The pressure in the sintering is preferably 4 GPa to 7 GPa. Although a sintering method is not particularly limited, spark plasma sintering (SPS), hot press, ultra-high pressure sintering, or the like can be used.

<<Cutting Tool>>

Since the sintered material according to the present embodiment exhibits the characteristics such as excellent chipping resistance and wear resistance, the sintered material according to the present embodiment is suitably used in a cutting tool and the like. Namely, a cutting tool according to the present embodiment includes the above-described sintered material.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

The above cutting tool may be entirely constituted of the sintered material of the present embodiment, or may be partially (for example, edge portion) constituted of the sintered material of the present embodiment. A coating film may be formed on a surface of the cutting tool.

Examples

While the present invention will be described in more detail hereinafter with reference to Examples, the present invention is not limited thereto.

<<Sintered Material Including Carbide as Second Material: Samples A1 to A48>>

As a raw material, the first material produced in the below-described procedure (neutralization co-precipitation method) was prepared. The second material was prepared as commercially available carbide powder. Further, in each of predetermined samples, a commercially available powder of a raw material to serve as the third phase was prepared as required.

<Samples A1 to A26>

Sintered materials of samples A1 to A26 are produced as follows.

(Production of First Material (Precursor))

As described above, the first material (precursor) can be produced by the following method based on the paper (J. Jpn. Soc. Powder Powder Metallurgy, Vol. 60, No. 10, P428-435) published in 2013.

Specifically, first, zirconium oxychloride ($ZrOCl_2 \cdot 8H_2O$), aluminum chloride ($AlCl_3$), and yttrium chloride ($YCl_3$) are added to water to prepare a mixed aqueous solution such that a volume ratio of $ZrO_2$ and $Y_2O_3$ satisfies "$ZrO_2$:$Y_2O_3$=98.5:1.5" and a molar ratio of $ZrO_2$ having $Y_2O_3$ added thereto and $Al_2O_3$ satisfies "($ZrO_2$ having $Y_2O_3$ added thereto):$Al_2O_3$=75:25".

Next, an aqueous ammonia solution is added to this mixed aqueous solution to co-precipitate Zr, Y, and Al through simultaneous neutralization, and the obtained precipitate is filtered, is washed by water, and is dried, thereby preparing amorphous hydrated zirconia (75 mol % (98.5 mol % of $ZrO_2$— 1.5 mol % of $Y_2O_3$)—25 mol % of $Al_2O_3$ solid solution powder.

The solid solution powder obtained in the above is calcined (heat-treated) under the conditions of 700° C., in the air and 9 hours, and is further calcined at 900° C. for 1 hour, to thereby obtain a crystalline $ZrO_2$ powder (in which $Al_2O_3$ and $Y_2O_3$ are dissolved in the solid state) which is the first material (precursor). This first material (precursor) is partially stabilized $ZrO_2$ in which 30 volume % of $Al_2O_3$ is dissolved in the solid state with respect to the whole of the first material. Here, in Tables 1 to 5 below, "ATZ (alumina toughened zirconia)" is described to represent the partially stabilized $ZrO_2$ in which $Al_2O_3$ serving as the first material is dissolved in the solid state.

Here, in each of samples A8, A15, and A22 of samples A1 to A26, as described below, instead of using the first material (precursor) produced by the above-described method, a commercially available partially stabilized $ZrO_2$ powder (Trademark: "TZ-3Y" provided by TOSOH; average particle size of 45 nm) in which $Al_2O_3$ was not dissolved in the solid state was prepared to be used.

(Preparation of Second Material)

For the second material, a commercially available carbide powder was prepared. Specifically, as the second material, the following materials were prepared: TiC (grade: TiC-01; provided by Japan New Metals); ZrC (grade: ZrC—F; provided by Japan New Metals); NbC (grade: NbC; provided by Japan New Metals); TaC (grade: TaC; provided by Japan New Metals); SiC (grade: SII02PB; provided by Kojundo Chemical Laboratory); $Mo_2C$ (grade: $Mo_2C$; provided by Japan New Metals); and WC (grade: WWI14PBWC; provided by Kojundo Chemical Laboratory). The particle size of the second material was 2 μm.

Then, the first material (precursor) and the second material constituted of the raw material powder shown in Table 1 were mixed using a ball mill to attain a blending amount (volume %) shown in Table 1, thereby obtaining a mixture of each sample. Regarding each of samples A8, A15, and A22, a commercially available partially stabilized $ZrO_2$ powder in which $Al_2O_3$ was not dissolved in the solid state was mixed with the powder serving as the raw material of the second material using a ball mill so as to attain a blending amount (volume %) shown in Table 1, thereby obtaining each mixture.

Next, the mixtures of samples A1 to A6 and A8 to A26 were sintered for 15 minutes at a pressure of 7 GPa and a sintering temperature of 1400° C., thereby obtaining sintered materials of samples A1 to A6 and A8 to A26. The mixture of sample A7 was sintered for 15 minutes at a pressure of 7 GPa and a sintering temperature of 1700° C., thereby obtaining a sintered material of sample A7.

Each of the sintered materials of samples A1 to A26 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in each of samples A1 to A6, A9 to A14, A16 to A21, and A23 to A26, the grain size of $Al_2O_3$ was 0.05 μm, and the content thereof coincided with that of the raw material (30 volume %; the position of presence thereof was in the crystal grain boundaries or the crystal grains). In the sintered material of sample A7, the content of $Al_2O_3$ coincided with that of the raw material; however, the grain size of $Al_2O_3$ was 2 μm. In each of the sintered materials of samples A1 to A6, A9 to A14, A16 to A21, and A23 to A26, the average grain size of the first material was 0.15 μm. In each of the sintered materials of samples A8, A15, and A22, the average grain size of the partially stabilized $ZrO_2$ was 0.045 μm. In the sintered material of sample A7, the average grain size of the first material was 2.5 μm. Further, in each of the sintered materials of samples A1 to A26, the average grain size of the second material coincided with the average particle size of the raw material.

Then, in each of the sintered materials of samples A1 to A26, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, and the region of the second material. Then, respective areas thereof were measured by a binarization process with the above-described image analysis software. Accordingly, it could be confirmed that: each sintered material included the first material or the partially stabilized $ZrO_2$ in which $Al_2O_3$ was not dissolved in the solid state, and the second material; and the ratio of these coincided with the ratio of the raw materials.

<Samples A27 to A38>

Each of sintered materials of samples A27 to A38 is produced as follows.

(Production of First Material (Precursor) Used for Each of Samples A27, A31, and A35)

The first material (precursor) can be produced in accordance with the same method as the method for producing the first material (precursor) used for sample A1 except for the following points.

That is, in the production of the first material (precursor) used for each of samples A27, A31, and A35, a mixed aqueous solution is prepared such that a molar ratio of $ZrO_2$ having $Y_2O_3$ added thereto and $Al_2O_3$ satisfies "($ZrO_2$ having $Y_2O_3$ added thereto):$Al_2O_3$=5:95". Further, an amorphous hydrated zirconia solid solution powder obtained from this mixed aqueous solution is prepared such that a molar ratio of $ZrO_2$ having $Y_2O_3$ added thereto and $Al_2O_3$ satisfies 5 mol % (98.5 mol % $ZrO_2$— 1.5 mol % $Y_2O_3$)—95 mol % $Al_2O_3$.

The produced first material (precursor) used for each of samples A27, A31, and A35 is partially stabilized $ZrO_2$ in which 96 volume % of $Al_2O_3$ is dissolved in the solid state with respect to the whole of the first material.

(Production of First Material (Precursor) Used for Each of Samples A28, A32, and A36)

The first material (precursor) can be produced in accordance with the same method as the method for producing the first material (precursor) used for sample A1 except for the following points.

That is, in the production of the first material (precursor) used for each of samples A28, A32, and A36, a mixed aqueous solution is prepared such that a molar ratio of $ZrO_2$ having $Y_2O_3$ added thereto and $Al_2O_3$ satisfies "($ZrO_2$ having $Y_2O_3$ added thereto):$Al_2O_3$=15:85". Further, an amorphous hydrated zirconia solid solution powder obtained from this mixed aqueous solution is prepared such that a molar ratio of $ZrO_2$ having $Y_2O_3$ added thereto and $Al_2O_3$ satisfies 15 mol % (98.5 mol % $ZrO_2$— 1.5 mol % $Y_2O_3$)—85 mol % $Al_2O_3$.

The produced first material (precursor) used for each of samples A28, A32, and A36 is partially stabilized $ZrO_2$ in which 88 volume % of $Al_2O_3$ is dissolved in the solid state with respect to the whole of the first material.

(Production of First Material (Precursor) Used for Each of Samples A29, A33, and A37)

The first material (precursor) can be produced in accordance with the same method as the method for producing the first material (precursor) used for sample A1 except for the following points.

That is, in the production of the first material (precursor) used for each of samples A29, A33, and A37, a mixed aqueous solution is prepared such that a molar ratio of $ZrO_2$ having $Y_2O_3$ added thereto and $Al_2O_3$ satisfied "($ZrO_2$ having $Y_2O_3$ added thereto):$Al_2O_3$=55:45". Further, an amorphous hydrated zirconia solid solution powder obtained from this mixed aqueous solution is prepared such that a molar ratio of $ZrO_2$ having $Y_2O_3$ added thereto and $Al_2O_3$ satisfies 55 mol % (98.5 mol % $ZrO_2$— 1.5 mol % $Y_2O_3$)—45 mol % $Al_2O_3$.

The produced first material (precursor) used for each of samples A29, A33, and A37 is partially stabilized $ZrO_2$ in which 51 volume % of $Al_2O_3$ is dissolved in the solid state with respect to the whole of the first material.

(Production of First Material (Precursor) Used for Each of Samples A30, A34, and A38)

The first material (precursor) can be produced in accordance with the same method as the method for producing the first material (precursor) used for sample A1 except for the following points.

That is, in the production of the first material (precursor) used for each of samples A30, A34, and A38, a mixed aqueous solution is prepared such that a molar ratio of $ZrO_2$ having $Y_2O_3$ added thereto and $Al_2O_3$ satisfies "($ZrO_2$ having $Y_2O_3$ added thereto):$Al_2O_3$=99.5:0.5". Further, an amorphous hydrated zirconia solid solution powder obtained from this mixed aqueous solution is prepared such that a molar ratio of $ZrO_2$ having $Y_2O_3$ added thereto and $Al_2O_3$ satisfies 99.5 mol % (98.5 mol % $ZrO_2$— 1.5 mol % $Y_2O_3$)—0.5 mol % $Al_2O_3$.

The produced first material (precursor) used for each of samples A30, A34, and A38 is partially stabilized $ZrO_2$ in which 0.6 volume % of $Al_2O_3$ is dissolved in the solid state with respect to the whole of the first material.

(Preparation of Second Material)

For the second material, a commercially available carbide powder was prepared. Specifically, as the second material, TiC (grade: TiC-01; provided by Japan New Metals), ZrC (grade: ZrC—F; provided by Japan New Metals), and WC (grade: WWI14PBWC; provided by Kojundo Chemical Laboratory) were prepared.

Then, the first material (precursor) was mixed with the second material constituted of the raw material powder shown in Table 2 using a ball mill so as to attain a blending amount (volume %) shown in Table 2, thereby obtaining a mixture of each sample.

Next, the mixtures of samples A27 to A38 were sintered for 15 minutes at a pressure of 7 GPa and a sintering temperature of 1400° C., thereby obtaining sintered materials of samples A27 to A38.

Each of the sintered materials of samples A27 to A38 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in each of samples A27 to A38, the grain size of $Al_2O_3$ was 0.05 μm, and the content thereof coincided with that of the raw material (30 volume %; the position of presence thereof was in the crystal grain boundaries or the crystal grains). In the sintered material of each of samples A27 to A38, the average grain size of the first material was 0.15 μm. Further, in each of the sintered materials of samples A27 to A38, the average grain size of the second material coincided with the average particle size of the raw material.

Then, in each of the sintered materials of samples A27 to A38, a reflected electron image obtained by measuring a CP-processed surface using a scanning electron microscope (SEM), or an elemental analysis by Auger electron spectroscopy was employed to identify the region of the first material and the region of the second material. Then, respective areas thereof were measured by a binarization process with the above-described image analysis software. Accordingly, it could be confirmed that: each sintered material included the first material and the second material; and the ratio of the first material and the second material coincided with the ratio of the raw materials.

<Samples A39 to A48>

Each of sintered materials of samples A39 to A48 is produced as follows.

(Production of First Material (Precursor) Used for Each of Samples A39 to A45)

The first material (precursor) can be produced in accordance with the same method as the method for producing the first material (precursor) used for sample A1. This first material (precursor) is partially stabilized $ZrO_2$ in which 30 volume % of $Al_2O_3$ is dissolved in the solid state with respect to the whole of the first material.

Here, in each of samples A46 to A48, as described below, instead of using the first material (precursor) produced by the above-described method, a commercially available partially stabilized $ZrO_2$ powder (Trademark: "TZ-3Y" provided by TOSOH; average particle size of 45 nm) in which $Al_2O_3$ was not dissolved in the solid state was prepared to be used.

(Preparation of Second Material)

For the second material, a commercially available carbide powder was prepared. Specifically, as the second material, TiC (grade: TiC-01; provided by Japan New Metals), ZrC (grade: ZrC—F; provided by Japan New Metals), and WC (grade: WWl14PBWC; provided by Kojundo Chemical Laboratory) were prepared. The particle size of the second material was 2 μm.

(Preparation of Third Phase)

For the raw material of the third phase, the following commercially available powders were prepared: $Al_2O_3$ powder (trademark: "TM-DAR" provided by Taimei Chemicals; average particle size of 0.1 μm); MgO powder (trademark: "FNM-G" provided by Tateho Chemical Industries; average particle size of 0.5 μm); $Ce_2O$ powder (trademark: "CE005PB" provided Kojundo Chemical Laboratory; average particle size of 0.2 μm); $Y_2O_3$ powder (trademark: "YY003PB" provided by Kojundo Chemical Laboratory; average particle size of 0.4 μm); and $HfO_2$ powder (trademark: "HF001PB" provided by Kojundo Chemical Laboratory; average particle size of 2 μm).

Then, the first material (precursor), the second material constituted of the raw material powder shown in Table 2, and the third phase constituted of the raw material powder shown in Table 2 were mixed using a ball mill so as to attain a blending amount (volume %) shown in Table 2, thereby obtaining a mixture of each sample. For each of samples A46 to A48, a commercially available partially stabilized $ZrO_2$ powder in which $Al_2O_3$ was not dissolved in the solid state, the powder serving as the raw material of the second material, and the powder serving as the raw material of the third phase were mixed using a ball mill so as to attain a blending amount (volume %) shown in Table 2, thereby obtaining each mixture.

Next, the mixtures of samples A39 to A48 were sintered for 15 minutes at a pressure of 7 GPa and a sintering temperature of 1400° C., thereby obtaining sintered materials of samples A39 to A48.

Each of the sintered materials of samples A39 to A48 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in each of the sintered materials of samples A39 to A45, the grain size of $Al_2O_3$ was 0.05 μm, and the content thereof coincided with that of the raw material (30 volume %; the position of presence thereof was in the crystal grain boundaries or the crystal grains). In each of the sintered materials of samples A39 to A45, the average grain size of the first material was 0.15 μm. In each of the sintered materials of samples A46 to A48, the average grain size of the partially stabilized $ZrO_2$ was 0.045 μm. Further, in each of the sintered materials of samples A39 to A48, the average grain size of the second material coincided with the average particle size of the raw material.

Then, in each of the sintered materials of samples A39 to A48, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, the region of the second material, and the region of the third phase. Then, respective areas thereof were measured by a binarization process with the above-described image analysis software. Accordingly, it could be confirmed that: each sintered material included the first material or partially stabilized $ZrO_2$ in which $Al_2O_3$ was not dissolved in the solid state, the second material, and the third phase; and the ratio of these coincided with the ratio of the raw materials.

TABLE 1

| Sample No. | First Material | | | | | | | Second Material | | | |
|---|---|---|---|---|---|---|---|---|---|---|---|
| | ATZ 96 vol % $Al_2O_3$ | ATZ 88 vol % $Al_2O_3$ | ATZ 51 vol % $Al_2O_3$ | ATZ 30 vol % $Al_2O_3$ | ATZ 30 vol % $Al_2O_3$ grain size 2 μm | ATZ 0.6 vol % $Al_2O_3$ | $ZrO_2$ | TiC | ZrC | NbC | TaC |
| A1 | — | — | — | 4 | — | — | — | 96 | — | — | — |
| A2 | — | — | — | 10 | — | — | — | 90 | — | — | — |
| A3 | — | — | — | 40 | — | — | — | 60 | — | — | — |
| A4 | — | — | — | 70 | — | — | — | 30 | — | — | — |
| A5 | — | — | — | 90 | — | — | — | 10 | — | — | — |
| A6 | — | — | — | 96 | — | — | — | 4 | — | — | — |
| A7 | — | — | — | — | 70 | — | — | 30 | — | — | — |
| A8 | — | — | — | — | — | — | 70 | 30 | — | — | — |
| A9 | — | — | — | 4 | — | — | — | — | 96 | — | — |
| A10 | — | — | — | 10 | — | — | — | — | 90 | — | — |
| A11 | — | — | — | 40 | — | — | — | — | 60 | — | — |
| A12 | — | — | — | 70 | — | — | — | — | 30 | — | — |
| A13 | — | — | — | 90 | — | — | — | — | 10 | — | — |
| A14 | — | — | — | 96 | — | — | — | — | 4 | — | — |

TABLE 1-continued

| Sample No. | ATZ 96 vol% Al₂O₃ | ATZ 88 vol% Al₂O₃ | ATZ 51 vol% Al₂O₃ | ATZ 30 vol% Al₂O₃ | ATZ 30 vol% Al₂O₃ Grain Size 2 μm | ATZ 0.6 vol% Al₂O₃ | ZrO₂ | TiC | ZrC | NbC | TaC |
|---|---|---|---|---|---|---|---|---|---|---|---|
| A15 | — | — | — | — | — | — | 70 | — | 30 | — | — |
| A16 | — | — | — | 4 | — | — | — | — | — | — | — |
| A17 | — | — | — | 10 | — | — | — | — | — | — | — |
| A18 | — | — | — | 40 | — | — | — | — | — | — | — |
| A19 | — | — | — | 70 | — | — | — | — | — | — | — |
| A20 | — | — | — | 90 | — | — | — | — | — | — | — |
| A21 | — | — | — | 96 | — | — | — | — | — | — | — |
| A22 | — | — | — | — | — | — | 70 | — | — | — | — |
| A23 | — | — | — | 40 | — | — | — | — | — | 60 | — |
| A24 | — | — | — | 40 | — | — | — | — | — | — | 60 |
| A25 | — | — | — | 40 | — | — | — | — | — | — | — |
| A26 | — | — | — | 40 | — | — | — | — | — | — | — |

| Sample No. | Second Material | | | Third Phase | | | | | Wear Amount (μm) | Chipping State After 10-km Processing | Notes |
|---|---|---|---|---|---|---|---|---|---|---|---|
| | Mo₂C | SiC | WC | Al₂O₃ | MgO | Ce₂O | Y₂O₃ | HfO₂ | | | |
| A1 | — | — | — | — | — | — | — | — | 100 | C | Too Large Amount of TiC |
| A2 | — | — | — | — | — | — | — | — | 109 | B | |
| A3 | — | — | — | — | — | — | — | — | 111 | A | |
| A4 | — | — | — | — | — | — | — | — | 122 | A | |
| A5 | — | — | — | — | — | — | — | — | 134 | A | |
| A6 | — | — | — | — | — | — | — | — | 155 | C | Too Small Amount of TiC |
| A7 | — | — | — | — | — | — | — | — | 125 | C | Coarse Al₂O₃ |
| A8 | — | — | — | — | — | — | — | — | 134 | C | No ATZ |
| A9 | — | — | — | — | — | — | — | — | 109 | C | Too Large Amount of ZrC |
| A10 | — | — | — | — | — | — | — | — | 119 | B | |
| A11 | — | — | — | — | — | — | — | — | 122 | A | |
| A12 | — | — | — | — | — | — | — | — | 131 | A | |
| A13 | — | — | — | — | — | — | — | — | 145 | A | |
| A14 | — | — | — | — | — | — | — | — | 162 | C | Too Small Amount of ZrC |
| A15 | — | — | — | — | — | — | — | — | 147 | C | No ATZ |
| A16 | — | — | 96 | — | — | — | — | — | 120 | C | Too Large Amount of WC |
| A17 | — | — | 90 | — | — | — | — | — | 132 | C | |
| A18 | — | — | 60 | — | — | — | — | — | 130 | A | |
| A19 | — | — | 30 | — | — | — | — | — | 145 | A | |
| A20 | — | — | 10 | — | — | — | — | — | 153 | A | |
| A21 | — | — | 4 | — | — | — | — | — | 168 | C | Too Small Amount of WC |
| A22 | — | — | 30 | — | — | — | — | — | 155 | C | No ATZ |
| A23 | — | — | — | — | — | — | — | — | 151 | B | |
| A24 | — | — | — | — | — | — | — | — | 146 | B | |
| A25 | 60 | — | — | — | — | — | — | — | 167 | B | |
| A26 | — | 60 | — | — | — | — | — | — | 153 | B | |

TABLE 2

| Sample No. | First Material | | | | | | | Second Material | | | |
|---|---|---|---|---|---|---|---|---|---|---|---|
| | ATZ 96 vol% Al₂O₃ | ATZ 88 vol% Al₂O₃ | ATZ 51 vol% Al₂O₃ | ATZ 30 vol% Al₂O₃ | ATZ 30 vol% Al₂O₃ Grain Size 2 μm | ATZ 0.6 vol% Al₂O₃ | ZrO₂ | TiC | ZrC | NbC | TaC |
| A27 | 40 | — | — | — | — | — | — | 60 | — | — | — |
| A28 | — | 40 | — | — | — | — | — | 60 | — | — | — |
| A29 | — | — | 40 | — | — | — | — | 60 | — | — | — |
| A30 | — | — | — | — | — | 40 | — | 60 | — | — | — |
| A31 | 40 | — | — | — | — | — | — | — | 60 | — | — |
| A32 | — | 40 | — | — | — | — | — | — | 60 | — | — |
| A33 | — | — | 40 | — | — | — | — | — | 60 | — | — |
| A34 | — | — | — | — | — | 40 | — | — | 60 | — | — |
| A35 | 40 | — | — | — | — | — | — | — | — | — | — |
| A36 | — | 40 | — | — | — | — | — | — | — | — | — |
| A37 | — | — | 40 | — | — | — | — | — | — | — | — |
| A38 | — | — | — | — | — | 40 | — | — | — | — | — |
| A39 | — | — | — | 10 | — | — | — | 30 | — | — | — |
| A40 | — | — | — | 10 | — | — | — | — | 30 | — | — |
| A41 | — | — | — | 10 | — | — | — | — | — | — | — |
| A42 | — | — | — | 10 | — | — | — | 30 | — | — | — |
| A43 | — | — | — | 10 | — | — | — | — | 30 | — | — |
| A44 | — | — | — | 10 | — | — | — | — | 30 | — | — |
| A45 | — | — | — | 10 | — | — | — | — | 30 | — | — |
| A46 | — | — | — | — | — | — | 10 | 30 | — | — | — |

TABLE 2-continued

| Sample No. | Second Material | | | Third Phase | | | | | Wear Amount (μm) | Chipping State After 10-km Processing | Notes |
|---|---|---|---|---|---|---|---|---|---|---|---|
| | Mo$_2$C | SiC | WC | Al$_2$O$_3$ | MgO | Ce$_2$O | Y$_2$O$_3$ | HfO$_2$ | | | |
| A27 | — | — | — | — | — | — | — | — | 100 | C | Too Large Amount of Al$_2$O$_3$ |
| A28 | — | — | — | — | — | — | — | — | 103 | B | |
| A29 | — | — | — | — | — | — | — | — | 106 | A | |
| A30 | — | — | — | — | — | — | — | — | 119 | C | Too Small Amount of Al$_2$O$_3$ |
| A31 | — | — | — | — | — | — | — | — | 107 | C | Too Large Amount of Al$_2$O$_3$ |
| A32 | — | — | — | — | — | — | — | — | 110 | B | |
| A33 | — | — | — | — | — | — | — | — | 115 | A | |
| A34 | — | — | — | — | — | — | — | — | 122 | C | Too Small Amount of Al$_2$O$_3$ |
| A35 | — | — | 60 | — | — | — | — | — | 112 | C | Too Large Amount of Al$_2$O$_3$ |
| A36 | — | — | 60 | — | — | — | — | — | 116 | B | |
| A37 | — | — | 60 | — | — | — | — | — | 122 | A | |
| A38 | — | — | 60 | — | — | — | — | — | 130 | C | Too Small Amount of Al$_2$O$_3$ |
| A39 | — | — | — | 60 | — | — | — | — | 99 | A | |
| A40 | — | — | — | 60 | — | — | — | — | 105 | A | |
| A41 | — | — | 30 | 60 | — | — | — | — | 112 | A | |
| A42 | — | — | — | — | 60 | — | — | — | 131 | B | |
| A43 | — | — | — | — | — | 60 | — | — | 135 | B | |
| A44 | — | — | — | — | — | — | 60 | — | 134 | B | |
| A45 | — | — | — | — | — | — | — | 60 | 129 | B | |
| A46 | — | — | — | 60 | — | — | — | — | 122 | C | No ATZ |
| A47 | — | — | — | 60 | — | — | — | — | 135 | C | No ATZ |
| A48 | — | — | 30 | 60 | — | — | — | — | 156 | C | No ATZ |

<<Sintered Material Including Carbonitride as Second Material: Samples B1 to B32>>

As a raw material, the first material produced in the below-described procedure (neutralization co-precipitation method) was prepared. The second material was a carbonitride, and various types of materials were prepared therefor using a below-described method. Further, in each of predetermined samples, a commercially available powder of a raw material to serve as the third phase was prepared as required.

<Samples B1 to B16>

Sintered materials of samples B1 to B16 are produced as follows.

(Production of First Material (Precursor))

The first material (precursor) can be produced in accordance with the same method as the method for producing the first material (precursor) used for sample A1. This first material (precursor) is partially stabilized ZrO$_2$ in which 30 volume % of Al$_2$O$_3$ is dissolved in the solid state with respect to the whole of the first material.

Here, in each of samples B7 and B14 of samples B1 to B16, as described below, instead of using the first material (precursor) produced by the above-described method, a commercially available partially stabilized ZrO$_2$ powder (Trademark: "TZ-3Y" provided by TOSOH; average particle size of 45 nm) in which Al$_2$O$_3$ was not dissolved in the solid state was prepared to be used.

(Preparation of Second Material)

The second material was prepared by obtaining a carbonitride powder using the following method. Specifically, TiCN was mixed with TiC (grade: TiC-01; provided by Japan New Metals) and TiN (grade: TiN-01; provided by Japan New Metals) using a ball mill or a bead mill, thereby obtaining a mixture. ZrCN was mixed with ZrC (grade: ZrC—F; provided by Japan New Metals) and ZrN (grade: ZrN-01; provided by Japan New Metals) using a ball mill or a bead mill, thereby obtaining a mixture. NbCN was mixed with NbC (grade: NbC; provided by Japan New Metals) and NbN (grade: NbN-0; provided by Japan New Metals) using a ball mill or a bead mill, thereby obtaining a mixture. TaCN was mixed with TaC (grade: TaC; provided by Japan New Metals) and TaN (grade: TaN-0; provided by Japan New Metals) using a ball mill or a bead mill, thereby obtaining a mixture.

Then, each mixture was subjected to a heat treatment at 2000° C. in an Ar atmosphere within a carbon furnace, and the heat-treated material was then pulverized using a carbide stick and a mill, thereby obtaining each carbonitride powder.

Then, the first material (precursor) was mixed with the second material constituted of the raw material powder shown in Table 3 using a ball mill so as to attain a blending amount (volume %) shown in Table 3, thereby obtaining a mixture of each sample. For each of samples B7 and B14, a commercially available partially stabilized ZrO$_2$ powder in which Al$_2$O$_3$ was not dissolved in the solid state was mixed with a powder serving as the raw material of the second material using a ball mill so as to attain a blending amount (volume %) shown in Table 3, thereby obtaining a mixture.

Next, the mixtures of samples B1 to B16 were sintered for 15 minutes at a pressure of 7 GPa and a sintering temperature of 1400° C., thereby obtaining sintered materials of samples B1 to B16.

Each of the sintered materials of samples B1 to B16 was subjected to a CP process as described above, and a cross section thereof was observed with the SEM, to thereby identify a position of presence of Al$_2$O$_3$ in the first material. In addition, by a binarization process with image analysis software (trademark: "WinROOF ver. 6.5.3" provided by Mitani Corporation), an equivalent circle diameter (grain size) and a content of Al$_2$O$_3$ were calculated. As a result, it was confirmed that in the sintered material of each of samples B1 to B6, B8 to B13, B15 and B16, the grain size of Al$_2$O$_3$ was 0.05 μm, and the content thereof coincided with that of the raw material (30 volume %; the position of presence thereof was in the crystal grain boundaries or the crystal grains). In each of the sintered materials of samples B1 to B6, B8 to B13, B15 and B16, the average grain size of the first material was 0.15 µm. In each of the sintered materials of samples B7 and B14, the average grain size of the partially stabilized $ZrO_2$ was 0.1 µm. Further, in each of the sintered materials of samples B1 to B16, the average grain size of the second material coincided with the average particle size of the raw material.

Then, in each of the sintered materials of samples B1 to B16, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, and the region of the second material. Then, respective areas thereof were measured by a binarization process with the above-described image analysis software. Accordingly, it could be confirmed that: each sintered material included the first material or the partially stabilized $ZrO_2$ in which $Al_2O_3$ was not dissolved in the solid state, and the second material; and the ratio of these coincided with the ratio of the raw materials.

<Samples B17 to B24>

The sintered materials of samples B17 to B24 are produced as follows.

(Production of First Material (Precursor) Used for Each of Samples B17 and B21)

The first material (precursor) can be produced in accordance with the same method as the method for producing the first material (precursor) used for sample A27. This first material (precursor) is partially stabilized $ZrO_2$ in which 96 volume % of $Al_2O_3$ is dissolved in the solid state with respect to the whole of the first material.

(Production of First Material (Precursor) Used for Each of Samples B18 and B22)

The first material (precursor) can be produced in accordance with the same method as the method for producing the first material (precursor) used for sample A28. This first material (precursor) is partially stabilized $ZrO_2$ in which 88 volume % of $Al_2O_3$ is dissolved in the solid state with respect to the whole of the first material.

(Production of First Material (Precursor) Used for Each of Samples B19 and B23)

The first material (precursor) can be produced in accordance with the same method as the method for producing the first material (precursor) used for sample A29. This first material (precursor) is partially stabilized $ZrO_2$ in which 51 volume % of $Al_2O_3$ is dissolved in the solid state with respect to the whole of the first material.

(Production of First Material (Precursor) Used for Each of Samples B20 and B24)

The first material (precursor) can be produced in accordance with the same method as the method for producing the first material (precursor) used for sample A30. This first material (precursor) is partially stabilized $ZrO_2$ in which 0.6 volume % of $Al_2O_3$ is dissolved in the solid state with respect to the whole of the first material.

(Preparation of Second Material)

The second material was prepared by obtaining a carbonitride powder using the following method. Specifically, TiCN was mixed with TiC (grade: TiC-01; provided by Japan New Metals) and TiN (grade: TiN-01; provided by Japan New Metals) using a ball mill or a bead mill, thereby obtaining a mixture. ZrCN was mixed with ZrC (grade: ZrC—F; provided by Japan New Metals) and ZrN (grade: ZrN-01; provided by Japan New Metals) using a ball mill or a bead mill, thereby obtaining a mixture.

Then, each mixture was subjected to a heat treatment at 2000° C. in an Ar atmosphere within a carbon furnace, and the heat-treated material was then pulverized using a carbide stick and a mill, thereby obtaining each carbonitride powder.

Then, the first material (precursor) was mixed with the second material constituted of the raw material powder shown in Table 3 using a ball mill so as to attain a blending amount (volume %) shown in Table 3, thereby obtaining a mixture of each sample.

Next, the mixtures of samples B17 to B24 were sintered for 15 minutes at a pressure of 7 GPa and a sintering temperature of 1400° C., thereby obtaining sintered materials of samples B17 to B24.

Each of the sintered materials of samples B17 to B24 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in each of samples B17 to B24, the grain size of $Al_2O_3$ was 0.05 µm, and the content thereof coincided with that of the raw material (30 volume %; the position of presence thereof was in the crystal grain boundaries or the crystal grains). In the sintered material of each of samples B17 to B24, the average grain size of the first material was 0.15 µm. Further, in each of the sintered materials of samples B17 to B24, the average grain size of the second material coincided with the average particle size of the raw material.

Then, for each of the sintered materials of samples B17 to B24, regions of the first material and the second material were identified using a reflected electron image obtained by measuring the CP-processed surface with the scanning electron microscope (SEM) or using element analysis with Auger electron spectroscopy, and respective areas thereof were measured by a binarization process with the above-described image analysis software. Then, it could also be confirmed that: each sintered material included the first material and the second material; and the ratio of the first material and the second material coincided with the raw material ratio.

<Samples B25 to B32>

The sintered materials of samples B25 to B32 are produced as follows.

(Production of First Material (Precursor) Used for Each of Samples B25 to B30)

The first material (precursor) can be produced in accordance with the same method as the method for producing the first material (precursor) used for sample A1. This first material (precursor) is partially stabilized $ZrO_2$ in which 30 volume % of $Al_2O_3$ is dissolved in the solid state with respect to the whole of the first material.

In each of samples B31 and B32, as described below, instead of using the first material (precursor) produced by the above-described method, a commercially available partially stabilized $ZrO_2$ powder (Trademark: "TZ-3Y" provided by TOSOH; average particle size of 45 nm) in which $Al_2O_3$ was not dissolved in the solid state was prepared to be used.

(Preparation of Second Material)

The second material was prepared by obtaining a carbonitride powder using the following method. Specifically, TiCN was mixed with TiC (grade: TiC-01; provided by Japan New Metals) and TiN (grade: TiN-01; provided by Japan New Metals) using a ball mill or a bead mill, thereby obtaining a mixture. ZrCN was mixed with ZrC (grade: ZrC—F; provided by Japan New Metals) and ZrN (grade:

ZrN-01; provided by Japan New Metals) using a ball mill or a bead mill, thereby obtaining a mixture.

Then, each mixture was subjected to a heat treatment at 2000° C. in an Ar atmosphere within a carbon furnace, and the heat-treated material was then pulverized using a carbide stick and a mill, thereby obtaining each carbonitride powder.

(Preparation of Third Phase)

As the raw material of the third phase, each of the following commercially available powders was prepared: $Al_2O_3$ powder (trademark: "TM-DAR" provided by Taimei Chemicals; average particle size of 0.1 μm); MgO powder (trademark: "FNM-G" provided by the Tateho Chemical Industries; average particle size of 0.5 μm); $Ce_2O$ powder (trademark: "CE005PB" provided by Kojundo Chemical Laboratory; average particle size of 0.2 μm); $Y_2O_3$ powder (trademark: "YY003PB" provided by Kojundo Chemical Laboratory; average particle size of 0.4 μm); and $HfO_2$ powder (trademark: "HF001PB" provided by Kojundo Chemical Laboratory; average particle size of 2 μm).

Then, the first material (precursor), the second material constituted of the raw material powder shown in Table 3, and the third material constituted of the raw material powder shown in Table 3 were mixed using a ball mill so as to attain a blending amount (volume %) shown in Table 3, thereby obtaining a mixture of each sample. For each of samples B31 and B32, a commercially available partially stabilized $ZrO_2$ powder in which $Al_2O_3$ was not dissolved in the solid state, the powder serving as the raw material of the second material, and the powder serving as the raw material of the third phase were mixed using a ball mill so as to attain a blending amount (volume %) shown in Table 3, thereby obtaining a mixture.

Next, the mixtures of samples B25 to B32 were sintered for 15 minutes at a pressure of 7 GPa and a sintering temperature of 1400° C., thereby obtaining sintered materials of samples B25 to B32.

Each of the sintered materials of samples B25 to B32 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in each of samples B25 to B30, the grain size of $Al_2O_3$ was 0.05 μm, and the content thereof coincided with that of the raw material (30 volume %; the position of presence thereof was in the crystal grain boundaries or the crystal grains). In the sintered material of each of samples B25 to B30, the average grain size of the first material was 0.15 μm. In each of the sintered materials of samples B31 and B32, the average grain size of the partially stabilized $ZrO_2$ was 0.045 μm. Further, in each of the sintered materials of samples B25 to B32, the average grain size of the second material coincided with the average particle size of the raw material.

Then, in each of the sintered materials of samples B25 to B32, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, the region of the second material, and the region of the third phase. Then, respective areas thereof were measured by a binarization process with the above-described image analysis software. Accordingly, it could be confirmed that: each sintered material included the first material or the partially stabilized $ZrO_2$ in which $Al_2O_3$ was not dissolved in the solid state, the second material, and the third phase; and the ratio of these coincided with the ratio of the raw materials.

TABLE 3

| Sample No. | First Material ATZ 96 vol % $Al_2O_3$ | First Material ATZ 88 vol % $Al_2O_3$ | First Material ATZ 51 vol % $Al_2O_3$ | First Material ATZ 30 vol % $Al_2O_3$ | First Material ATZ 0.6 vol % $Al_2O_3$ | $ZrO_2$ | Second Material TiCN | Second Material ZrCN | Second Material NbCN | Second Material TaCN |
|---|---|---|---|---|---|---|---|---|---|---|
| B1 | — | — | — | 4 | — | — | 96 | — | — | — |
| B2 | — | — | — | 10 | — | — | 90 | — | — | — |
| B3 | — | — | — | 40 | — | — | 60 | — | — | — |
| B4 | — | — | — | 70 | — | — | 30 | — | — | — |
| B5 | — | — | — | 90 | — | — | 10 | — | — | — |
| B6 | — | — | — | 96 | — | — | 4 | — | — | — |
| B7 | — | — | — | — | — | 70 | 30 | — | — | — |
| B8 | — | — | — | 4 | — | — | — | 96 | — | — |
| B9 | — | — | — | 10 | — | — | — | 90 | — | — |
| B10 | — | — | — | 40 | — | — | — | 60 | — | — |
| B11 | — | — | — | 70 | — | — | — | 30 | — | — |
| B12 | — | — | — | 90 | — | — | — | 10 | — | — |
| B13 | — | — | — | 96 | — | — | — | 4 | — | — |
| B14 | — | — | — | — | — | 70 | — | 30 | — | — |
| B15 | — | — | — | 40 | — | — | — | — | 60 | — |
| B16 | — | — | — | 40 | — | — | — | — | — | 60 |
| B17 | 40 | — | — | — | — | — | 60 | — | — | — |
| B18 | — | 40 | — | — | — | — | 60 | — | — | — |
| B19 | — | — | 40 | — | — | — | 60 | — | — | — |
| B20 | — | — | — | — | 40 | — | 60 | — | — | — |
| B21 | 40 | — | — | — | — | — | — | 60 | — | — |
| B22 | — | 40 | — | — | — | — | — | 60 | — | — |
| B23 | — | — | 40 | — | — | — | — | 60 | — | — |
| B24 | — | — | — | — | 40 | — | — | 60 | — | — |
| B25 | — | — | — | 10 | — | — | 30 | — | — | — |
| B26 | — | — | — | 10 | — | — | — | 30 | — | — |
| B27 | — | — | — | 10 | — | — | 30 | — | — | — |
| B28 | — | — | — | 10 | — | — | 30 | — | — | — |

TABLE 3-continued

| Sample No. | | | | | | Wear Amount (μm) | Chipping State After 10-km Processing | Notes |
|---|---|---|---|---|---|---|---|---|
| B29 | — | — | — | 10 | — | — | 30 | — | — | — |
| B30 | — | — | — | 10 | — | — | 30 | — | — | — |
| B31 | — | — | — | — | — | 10 | 30 | — | — | — |
| B32 | — | — | — | — | — | 10 | — | 30 | — | — |

| Sample No. | Third Phase | | | | | Wear Amount (μm) | Chipping State After 10-km Processing | Notes |
|---|---|---|---|---|---|---|---|---|
| | $Al_2O_3$ | MgO | $Ce_2O$ | $Y_2O_3$ | $HfO_2$ | | | |
| B1 | — | — | — | — | — | 103 | C | Too Large Amount of TiCN |
| B2 | — | — | — | — | — | 112 | B | |
| B3 | — | — | — | — | — | 114 | A | |
| B4 | — | — | — | — | — | 125 | A | |
| B5 | — | — | — | — | — | 137 | A | |
| B6 | — | — | — | — | — | 158 | C | Too Small Amount of TiCN |
| B7 | — | — | — | — | — | 137 | C | No ATZ |
| B8 | — | — | — | — | — | 112 | C | Too Large Amount of ZrCN |
| B9 | — | — | — | — | — | 122 | B | |
| B10 | — | — | — | — | — | 125 | A | |
| B11 | — | — | — | — | — | 134 | A | |
| B12 | — | — | — | — | — | 148 | A | |
| B13 | — | — | — | — | — | 165 | C | Too Large Amount of ZrCN |
| B14 | — | — | — | — | — | 150 | C | No ATZ |
| B15 | — | — | — | — | — | 154 | B | |
| B16 | — | — | — | — | — | 149 | B | |
| B17 | — | — | — | — | — | 103 | C | Too Large Amount of $Al_2O_3$ |
| B18 | — | — | — | — | — | 106 | B | |
| B19 | — | — | — | — | — | 109 | A | |
| B20 | — | — | — | — | — | 122 | C | Too Small Amount of $Al_2O_3$ |
| B21 | — | — | — | — | — | 110 | C | Too Large Amount of $Al_2O_3$ |
| B22 | — | — | — | — | — | 113 | B | |
| B23 | — | — | — | — | — | 118 | A | |
| B24 | — | — | — | — | — | 125 | C | Too Small Amount of $Al_2O_3$ |
| B25 | 60 | — | — | — | — | 102 | A | |
| B26 | 60 | — | — | — | — | 108 | A | |
| B27 | — | 60 | — | — | — | 134 | B | |
| B28 | — | — | 60 | — | — | 138 | B | |
| B29 | — | — | — | 60 | — | 137 | B | |
| B30 | — | — | — | — | 60 | 132 | B | |
| B31 | 60 | — | — | — | — | 125 | C | No ATZ |
| B32 | 60 | — | — | — | — | 138 | C | No ATZ |

<<Sintered Material Including Nitride as Second Material: Samples C1 to C34>>

As a raw material, the first material produced in the below-described procedure (neutralization co-precipitation method) was prepared. For the second material, a commercially available nitride powder was prepared. Further, in each of predetermined samples, a commercially available powder of a raw material to serve as the third phase was prepared as required.

<Samples C1 to C18>

Each of sintered materials of samples C1 to C18 is produced as follows.

(Production of First Material (Precursor))

The first material (precursor) can be produced in accordance with the same method as the method for producing the first material (precursor) used for sample A1. This first material (precursor) is partially stabilized $ZrO_2$ in which 30 volume % of $Al_2O_3$ is dissolved in the solid state with respect to the whole of the first material.

Here, in each of samples C7 and C14 of samples C1 to C18, as described below, instead of using the first material (precursor) produced by the above-described method, a commercially available partially stabilized $ZrO_2$ powder (Trademark: "TZ-3Y" provided by TOSOH; average particle size of 45 nm) in which $Al_2O_3$ was not dissolved in the solid state was prepared to be used.

(Preparation of Second Material)

For the second material, a commercially available nitride powder was prepared. Specifically, as the second material, there were prepared: TiN (grade: TiN-01; provided by Japan New Metals); ZrN (grade: ZrN-01; provided by Japan New Metals); NbN (grade: NbN-0; provided by Japan New Metals); TaN (grade: TaN-0 provided by Japan New Metals); $Si_3N_4$ (grade: SII09PB; provided by Kojundo Chemical Laboratory); and CrN (manufactured in accordance with the manufacturing method disclosed in Japanese Patent Laying-Open No. 2002-241113). The particle size of the second material was 2 μm.

Then, the first material (precursor) was mixed with the second material constituted of the raw material powder shown in Table 4 using a ball mill so as to attain a blending amount (volume %) shown in Table 4, thereby obtaining a mixture of each sample. For each of samples C7 and C14, a commercially available partially stabilized $ZrO_2$ powder in which $Al_2O_3$ was not dissolved in the solid state, and a powder serving as the raw material of the second material were mixed using a ball mill so as to attain a blending amount (volume %) shown in Table 4, thereby obtaining a mixture.

Next, the mixtures of samples C1 to C18 were sintered for 15 minutes at a pressure of 7 GPa and a sintering temperature of 1400° C., thereby obtaining sintered materials of samples C1 to C18.

Each of the sintered materials of samples C1 to C18 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in the sintered material of each of samples C1 to C6, C8 to C13, and C15 to C18, the grain size of $Al_2O_3$ was 0.05 μm, and the content thereof coincided with that of the raw material (30 volume %; the position of presence thereof was in the crystal grain boundaries or the crystal grains). In each of the sintered materials of samples C1 to C6, C8 to C13, and C15 to C18, the average grain size of the first material was 0.15 μm. In each of the sintered materials of samples C7 and C14, the average grain size of the partially stabilized $ZrO_2$ was 0.1 μm. Further, in each of the sintered materials of samples C1 to C18, the average grain size of the second material coincided with the average particle size of the raw material.

Then, in each of the sintered materials of samples C1 to C18, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, and the region of the second material. Then, respective areas thereof were measured by a binarization process with the above-described image analysis software. Accordingly, it could be confirmed that: each sintered material included the first material or the partially stabilized $ZrO_2$ in which $Al_2O_3$ was not dissolved in the solid state, and the second material; and the ratio of these coincided with the ratio of the raw materials.

<Samples C19 to C26>

Each of sintered materials of samples C19 to C26 is produced as follows.

(Production of First Material (Precursor) Used for Each of Samples C19 and C23)

The first material can be produced in accordance with the same method as the method for producing the first material (precursor) used for sample A27. This first material (precursor) is partially stabilized $ZrO_2$ in which 96 volume % of $Al_2O_3$ is dissolved in the solid state with respect to the whole of the first material.

(Production of First Material (Precursor) Used for Each of Samples C20 and C24)

The first material (precursor) can be produced in accordance with the same method as the method for producing the first material (precursor) used for sample A28. This first material (precursor) is partially stabilized $ZrO_2$ in which 88 volume % of $Al_2O_3$ is dissolved in the solid state with respect to the whole of the first material.

(Production of First Material (Precursor) Used for Each of Samples C21 and C25)

The first material (precursor) can be produced in accordance with the same method as the method for producing the first material (precursor) used for sample A29. This first material (precursor) is partially stabilized $ZrO_2$ in which 51 volume % of $Al_2O_3$ is dissolved in the solid state with respect to the whole of the first material.

(Production of First Material (Precursor) Used for Each of Samples C22 and C26)

The first material (precursor) can be produced in accordance with the same method as the method for producing the first material (precursor) used for sample A30. This first material (precursor) is partially stabilized $ZrO_2$ in which 0.6 volume % of $Al_2O_3$ is dissolved in the solid state with respect to the whole of the first material.

(Preparation of Second Material)

For the second material, a commercially available nitride powder was prepared. Specifically, as the second material, TiN (grade: TiN-01; provided by Japan New Metals) and ZrN (grade: ZrN-01; provided by Japan New Metals) were prepared. The particle size of the second material was 2 μm.

Then, the first material (precursor) was mixed with the second material constituted of the raw material powder shown in Table 4 using a ball mill so as to attain a blending amount (volume %) shown in Table 4, thereby obtaining a mixture of each sample.

Next, the mixtures of samples C19 to C26 were sintered for 15 minutes at a pressure of 7 GPa and a sintering temperature of 1400° C., thereby obtaining sintered materials of samples C19 to C26.

Each of the sintered materials of samples C19 to C26 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in each of samples C19 to C26, the grain size of $Al_2O_3$ was 0.05 μm, and the content thereof coincided with that of the raw material (30 volume %; the position of presence thereof was in the crystal grain boundaries or the crystal grains). In the sintered material of each of samples C19 to C26, the average grain size of the first material was 0.15 μm. Further, in each of the sintered materials of samples C19 to C26, the average grain size of the second material coincided with the average particle size of the raw material.

In addition, for the sintered materials of samples C19 to C26, regions of the first material and the second material were identified using a reflected electron image obtained by measuring the CP-processed surface with the scanning electron microscope (SEM) or using element analysis with Auger electron spectroscopy, and respective areas thereof were measured by a binarization process with the above-described image analysis software. Then, it could also be confirmed that: each sintered material included the first material and the second material; and the ratio of the first material and the second material coincided with the ratio of the raw materials.

<Samples C27 to C34>

The sintered materials of samples C27 to C34 are produced as follows.

(Production of First Material (Precursor) Used for Each of Samples C27 to C32)

The first material (precursor) can be produced in accordance with the same method as the method for producing the first material (precursor) used for sample A1. This first material (precursor) is partially stabilized $ZrO_2$ in which 30 volume % of $Al_2O_3$ is dissolved in the solid state with respect to the whole of the first material.

In each of samples C33 and C34, as described below, instead of using the first material (precursor) produced by the above-described method, a commercially available partially stabilized $ZrO_2$ powder (Trademark: "TZ-3Y" provided by TOSOH; average particle size of 45 nm) in which $Al_2O_3$ was not dissolved in the solid state was prepared to be used.

(Preparation of Second Material)

For the second material, a commercially available nitride powder was prepared. Specifically, TiN (grade: TiN-01; provided by Japan New Metals) and ZrN (grade: ZrN-01;

provided by Japan New Metals) were prepared as the second material. The particle size of the second material was 2 μm.
(Preparation of Third Phase)

Each of the following commercially available powders was prepared as the raw material of the third phase: $Al_2O_3$ powder (trademark: "TM-DAR" provided by Taimei Chemicals; average particle size of 0.1 μm); MgO powder (trademark: "FNM-G" provided by Tateho Chemical Industries; average particle size of 0.5 μm); $Ce_2O$ powder (trademark: "CE005PB" provided by Kojundo Chemical Laboratory; average particle size of 0.2 μm); $Y_2O_3$ powder (trademark: "YY003PB" provided by Kojundo Chemical Laboratory; average particle size of 0.4 μm); and $HfO_2$ powder (trademark: "HF001PB" provided by Kojundo Chemical Laboratory; average particle size of 2 μm).

Then, the first material (precursor), the second material constituted of the raw material powder shown in Table 4, and the third material constituted of the raw material powder shown in Table 4 were mixed using a ball mill so as to attain a blending amount (volume %) shown in Table 4, thereby obtaining a mixture of each sample. For each of samples C33 and C34, the commercially available partially stabilized $ZrO_2$ powder in which $Al_2O_3$ was not dissolved in the solid state, the powder serving as the raw material of the second material, and the powder serving as the raw material of the third phase were mixed using a ball mill so as to attain a blending amount (volume %) shown in Table 4, thereby obtaining a mixture.

Next, the mixtures of samples C27 to C34 were sintered for 15 minutes at a pressure of 7 GPa and a sintering temperature of 1400° C., thereby obtaining sintered materials of samples C27 to C34.

Each of the sintered materials of samples C27 to C34 was subjected to a CP process as described above, and a cross section thereof was observed with the SEM, to thereby identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in the sintered material of each of samples C27 to C32, the grain size of $Al_2O_3$ was 0.05 μm, and the content thereof coincided with that of the raw material (30 volume %; the position of presence thereof was in the crystal grain boundaries or the crystal grains). In the sintered material of each of samples C27 to C32, the average grain size of the first material was 0.15 μm. In each of the sintered materials of samples C33 and C34, the average grain size of the partially stabilized $ZrO_2$ was 0.1 μm. Further, in each of the sintered materials of samples C27 to C34, the average grain size of the second material coincided with the average particle size of the raw material.

Then, in each of the sintered materials of samples C27 to C34, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, the region of the second material, and the region of the third phase. Then, respective areas thereof were measured by a binarization process with the above-described image analysis software. Accordingly, it could be confirmed that: each sintered material included the first material or the partially stabilized $ZrO_2$ in which $Al_2O_3$ was not dissolved in the solid state, the second material, and the third phase; and the ratio of these coincided with the ratio of the raw materials.

TABLE 4

| Sample No. | First Material ATZ 96 vol % $Al_2O_3$ | First Material ATZ 88 vol % $Al_2O_3$ | First Material ATZ 51 vol % $Al_2O_3$ | First Material ATZ 30 vol % $Al_2O_3$ | First Material ATZ 0.6 vol % $Al_2O_3$ | $ZrO_2$ | Second Material TiN | ZrN | NbN | TaN | CrN | $Si_3N_4$ |
|---|---|---|---|---|---|---|---|---|---|---|---|---|
| C1 | — | — | — | 4 | — | — | 96 | — | — | — | — | — |
| C2 | — | — | — | 10 | — | — | 90 | — | — | — | — | — |
| C3 | — | — | — | 40 | — | — | 60 | — | — | — | — | — |
| C4 | — | — | — | 70 | — | — | 30 | — | — | — | — | — |
| C5 | — | — | — | 90 | — | — | 10 | — | — | — | — | — |
| C6 | — | — | — | 96 | — | — | 4 | — | — | — | — | — |
| C7 | — | — | — | — | — | 70 | 30 | — | — | — | — | — |
| C8 | — | — | — | 4 | — | — | — | 96 | — | — | — | — |
| C9 | — | — | — | 10 | — | — | — | 90 | — | — | — | — |
| C10 | — | — | — | 40 | — | — | — | 60 | — | — | — | — |
| C11 | — | — | — | 70 | — | — | — | 30 | — | — | — | — |
| C12 | — | — | — | 90 | — | — | — | 10 | — | — | — | — |
| C13 | — | — | — | 96 | — | — | — | 4 | — | — | — | — |
| C14 | — | — | — | — | — | 70 | — | 30 | — | — | — | — |
| C15 | — | — | — | 40 | — | — | — | — | 60 | — | — | — |
| C16 | — | — | — | 40 | — | — | — | — | — | 60 | — | — |
| C17 | — | — | — | 40 | — | — | — | — | — | — | 60 | — |
| C18 | — | — | — | 40 | — | — | — | — | — | — | — | 60 |
| C19 | 40 | — | — | — | — | — | 60 | — | — | — | — | — |
| C20 | — | 40 | — | — | — | — | 60 | — | — | — | — | — |
| C21 | — | — | 40 | — | — | — | 60 | — | — | — | — | — |
| C22 | — | — | — | — | 40 | — | 60 | — | — | — | — | — |
| C23 | 40 | — | — | — | — | — | — | 60 | — | — | — | — |
| C24 | — | 40 | — | — | — | — | — | 60 | — | — | — | — |
| C25 | — | — | 40 | — | — | — | — | 60 | — | — | — | — |
| C26 | — | — | — | — | 40 | — | — | 60 | — | — | — | — |
| C27 | — | — | — | 10 | — | — | 30 | — | — | — | — | — |
| C28 | — | — | — | 10 | — | — | — | 30 | — | — | — | — |
| C29 | — | — | — | 10 | — | — | 30 | — | — | — | — | — |
| C30 | — | — | — | 10 | — | — | — | 30 | — | — | — | — |

TABLE 4-continued

| | | | | | | | | | | | | |
|---|---|---|---|---|---|---|---|---|---|---|---|---|
| C31 | — | — | — | 10 | — | — | 30 | — | — | — | — | — |
| C32 | — | — | — | 10 | — | — | 30 | — | — | — | — | — |
| C33 | — | — | — | — | — | 10 | 30 | — | — | — | — | — |
| C34 | — | — | — | — | — | 10 | — | 30 | — | — | — | — |

| Sample No. | Third Phase | | | | | Wear Amount (μm) | Chipping State After 10-km Processing | Notes |
|---|---|---|---|---|---|---|---|---|
| | $Al_2O_3$ | MgO | $Ce_2O$ | $Y_2O_3$ | $HfO_2$ | | | |
| C1 | — | — | — | — | — | 105 | C | Large Amount of TiN |
| C2 | — | — | — | — | — | 114 | B | |
| C3 | — | — | — | — | — | 116 | A | |
| C4 | — | — | — | — | — | 127 | A | |
| C5 | — | — | — | — | — | 139 | A | |
| C6 | — | — | — | — | — | 160 | C | Too Small Amount of TiN |
| C7 | — | — | — | — | — | 139 | C | No ATZ |
| C8 | — | — | — | — | — | 114 | C | Too Large Amount of ZrN |
| C9 | — | — | — | — | — | 124 | B | |
| C10 | — | — | — | — | — | 127 | A | |
| C11 | — | — | — | — | — | 136 | A | |
| C12 | — | — | — | — | — | 150 | A | |
| C13 | — | — | — | — | — | 167 | C | Too Small Amount of ZrN |
| C14 | — | — | — | — | — | 152 | C | No ATZ |
| C15 | — | — | — | — | — | 156 | B | |
| C16 | — | — | — | — | — | 151 | B | |
| C17 | — | — | — | — | — | 170 | B | |
| C18 | — | — | — | — | — | 163 | B | |
| C19 | — | — | — | — | — | 105 | C | Too Large Amount of $Al_2O_3$ |
| C20 | — | — | — | — | — | 108 | B | |
| C21 | — | — | — | — | — | 111 | A | |
| C22 | — | — | — | — | — | 124 | C | Too Small Amount of $Al_2O_3$ |
| C23 | — | — | — | — | — | 112 | C | Too Large Amount of $Al_2O_3$ |
| C24 | — | — | — | — | — | 115 | B | |
| C25 | — | — | — | — | — | 120 | A | |
| C26 | — | — | — | — | — | 127 | C | Too Small Amount of $Al_2O_3$ |
| C27 | 60 | — | — | — | — | 104 | A | |
| C28 | 60 | — | — | — | — | 110 | A | |
| C29 | — | 60 | — | — | — | 136 | B | |
| C30 | — | — | 60 | — | — | 140 | B | |
| C31 | — | — | — | 60 | — | 139 | B | |
| C32 | — | — | — | — | 60 | 134 | B | |
| C33 | 60 | — | — | — | — | 127 | C | No ATZ |
| C34 | 60 | — | — | — | — | 140 | C | No ATZ |

<<Sintered Material Including Two Types of Carbides as Second Material: Samples D1 to D14>>

As a raw material, the first material produced in the below-described procedure (neutralization co-precipitation method) was prepared. For the second material, a commercially available carbide powder was prepared. Further, in each of predetermined samples, a commercially available powder of a raw material to serve as the third phase was prepared as required. Specifically, the sintered materials of samples D1 to D14 are produced as follows.

(Production of First Material (Precursor) Used for Each of Samples D1 and D8)

The first material (precursor) can be produced in accordance with the same method as the method for producing the first material (precursor) used for sample A27. This first material (precursor) is partially stabilized $ZrO_2$ in which 96 volume % of $Al_2O_3$ is dissolved in the solid state with respect to the whole of the first material.

(Production of First Material (Precursor) Used for Each of Samples D2 and D9)

The first material (precursor) can be produced in accordance with the same method as the method for producing the first material (precursor) used for sample A28. This first material (precursor) is partially stabilized $ZrO_2$ in which 88 volume % of $Al_2O_3$ is dissolved in the solid state with respect to the whole of the first material.

(Production of First Material (Precursor) Used for Each of Samples D3 and D10)

The first material (precursor) can be produced in accordance with the same method as the method for producing the first material (precursor) used for sample A29. This first material (precursor) is partially stabilized $ZrO_2$ in which 51 volume % of $Al_2O_3$ is dissolved in the solid state with respect to the whole of the first material.

(Production of First Material (Precursor) Used for Each of Samples D4, D6, D11, and D13)

The first material (precursor) can be produced in accordance with the same method as the method for producing the first material (precursor) used for sample A1. This first material (precursor) is partially stabilized $ZrO_2$ in which 30 volume % of $Al_2O_3$ is dissolved in the solid state with respect to the whole of the first material.

(Production of First Material (Precursor) Used for Each of Samples D5 and D12)

The first material (precursor) can be produced in accordance with the same method as the method for producing the first material (precursor) used for sample A30. This first material (precursor) is partially stabilized $ZrO_2$ in which 0.6 volume % of $Al_2O_3$ is dissolved in the solid state with respect to the whole of the first material.

Here, in each of samples D7 and D14 of samples D1 to D14, as described below, instead of using the first material (precursor) produced by the above-described method, a commercially available partially stabilized $ZrO_2$ powder (Trademark: "TZ-3Y" provided by TOSOH; average particle size of 45 nm) in which $Al_2O_3$ was not dissolved in the solid state was prepared to be used.

(Preparation of Second Material)

For the second material, commercially available carbide powders were prepared. Specifically, as the second material, TiC (grade: TiC-01; provided by Japan New Metals), ZrC (grade: ZrC—F; provided by Japan New Metals), and WC (grade: WWI14PBWC; provided by Kojundo Chemical Laboratory) were prepared. The particle size of the second material was 2 μm.

(Preparation of Third Phase)

The following commercially available powder was prepared as the raw material of the third phase: $Al_2O_3$ powder (trademark: "TM-DAR" provided by Taimei Chemicals; average particle size of 0.1 μm).

Then, the first material (precursor) was mixed with the second material constituted of the raw material powder shown in Table 5 using a ball mill so as to attain a blending amount (volume %) shown in Table 5, thereby obtaining a mixture of each sample. For each of samples D6 and D13, the first material (precursor), the powder serving as the raw material of the second material, and the powder serving as the raw material of the third phase were mixed using a ball mill so as to attain a blending amount (volume %) shown in Table 5, thereby obtaining a mixture. For each of samples D7 and D14, a commercially available partially stabilized $ZrO_2$ powder in which $Al_2O_3$ was not dissolved in the solid state, the powder serving as the raw material of the second material, and the powder serving as the raw material of the third phase were mixed using a ball mill so as to attain a blending amount (volume %) shown in Table 5, thereby obtaining a mixture.

identify a position of presence of $Al_2O_3$ in the first material. In addition, by a binarization process with image analysis software (trademark: "WinROOF ver. 6.5.3" provided by Mitani Corporation), an equivalent circle diameter (grain size) and a content of $Al_2O_3$ were calculated. As a result, it was confirmed that in the sintered material of each of samples D1 to D6 and D8 to D13, the grain size of $Al_2O_3$ was 0.05 μm, and the content thereof coincided with that of the raw material (30 volume %; the position of presence thereof was in the crystal grain boundaries or the crystal grains). In the sintered material of each of samples D1 to D6 and D8 to D13, the average grain size of the first material was 0.15 μm. In each of the sintered materials of samples D7 and D14, the average grain size of the partially stabilized $ZrO_2$ was 0.045 μm. Further, in each of the sintered materials of samples D1 to D14, the average grain size of the second material coincided with the average particle size of the raw material.

Then, in each of the sintered materials of samples D1 to D14, a reflected electron image obtained by measuring a CP-processed surface using a scanning electron microscope (SEM), or an elemental analysis by Auger electron spectroscopy was employed to identify the region of the first material or partially stabilized $ZrO_2$ in which $Al_2O_3$ was not dissolved in the solid state, the region of the second material, and, in the case of samples D6, D7, D13, and D14, the region of the third phase. Then, respective areas thereof were measured by a binarization process with the above-described image analysis software. Accordingly, it could be confirmed that: each sintered material included the first material or the partially stabilized $ZrO_2$ in which $Al_2O_3$ was not dissolved in the solid state, the second material, and, in the case of samples D6, D7, D13, and D14, the third phase; and the ratio of these coincided with the ratio of the raw materials.

TABLE 5

| | First Material | | | | | | Second Material | | | Third Phase | Wear Amount | Chipping State After 10-km | |
|---|---|---|---|---|---|---|---|---|---|---|---|---|---|
| Sample No. | ATZ 96 vol % $Al_2O_3$ | ATZ 88 vol % $Al_2O_3$ | ATZ 51 vol % $Al_2O_3$ | ATZ 30 vol % $Al_2O_3$ | ATZ 0.6 vol % $Al_2O_3$ | $ZrO_2$ | TiC | ZrC | WC | $Al_2O_3$ | (μm) | Processing | Notes |
| D1 | 20 | — | — | — | — | — | 40 | — | 40 | — | 105 | C | Too Large Amount of $Al_2O_3$ |
| D2 | — | 20 | — | — | — | — | 40 | — | 40 | — | 110 | B | |
| D3 | — | — | 20 | — | — | — | 40 | — | 40 | — | 115 | A | |
| D4 | — | — | — | 20 | — | — | 40 | — | 40 | — | 121 | A | |
| D5 | — | — | — | — | 20 | — | 40 | — | 40 | — | 126 | C | Too Small Amount of $Al_2O_3$ |
| D6 | — | — | — | 20 | — | — | 40 | — | 40 | 20 | 104 | A | |
| D7 | — | — | — | — | — | 20 | 40 | — | 40 | 20 | 135 | C | No ATZ |
| D8 | 20 | — | — | — | — | — | — | 40 | 40 | — | 108 | C | Too Large Amount of $Al_2O_3$ |
| D9 | — | 20 | — | — | — | — | — | 40 | 40 | — | 113 | B | |
| D10 | — | — | 20 | — | — | — | — | 40 | 40 | — | 118 | A | |
| D11 | — | — | — | 20 | — | — | — | 40 | 40 | — | 124 | A | |
| D12 | — | — | — | — | 20 | — | — | 40 | 40 | — | 129 | C | Too Small Amount of $Al_2O_3$ |
| D13 | — | — | — | 20 | — | — | — | 40 | 40 | 20 | 107 | A | |
| D14 | — | — | — | — | — | 20 | — | 40 | 40 | 20 | 138 | C | No ATZ |

Next, the mixtures of samples D1 to D14 were sintered for 15 minutes at a pressure of 7 GPa and a sintering temperature of 1400° C., thereby obtaining sintered materials of samples D1 to D14.

Each of the sintered materials of samples D1 to D14 was subjected to a CP process as described above, and a cross section thereof was observed with the SEM, to thereby (Cutting Test)

Next, the sintered material of each of samples A1 to A48, samples B1 to B32, samples C1 to C34, and samples D1 to D14 was used to produce a cutting tool having the following shape: CNMA120408; a chamfer angle of 15°; and a chamfer width of 0.12 mm. Then, the sintered material was subjected to a cutting test using a NC lathe to perform high-speed strong interrupted cutting under the following cutting conditions.

Workpiece: carburized and quenched steel (SCM415-5V, HRC: 62)

Shape of the workpiece: cylindrical shape (outer diameter φ of 100 mm×length of 300 mm; five V grooves provided in the axial direction)

Cutting speed: V=130 m/min.
Feed: f=0.1 mm/rev.
Depth of cut: ap=0.2 mm
Wet type/dry type: dry type.
(Evaluation of Cutting)

In each of the cutting tools of samples A1 to A48, samples B1 to B32, samples C1 to C34, and samples D1 to D14, a flank wear amount (μm) upon 3-km cutting was measured (evaluated in wear resistance). Further, in each of these cutting tools, a chipping state upon 10-km cutting was observed (evaluated in chipping resistance). Regarding the chipping state, A represents a state in which there was no chipping in the cutting tool, B represents a state in which there was minute chipping but the cutting edge thereof remained, and C represents a state in which the cutting edge thereof ceased to exist due to chipping. Results are shown in Table 1 to Table 5. In this cutting test, the carburized and quenched steel was used as the workpiece; however, the workpiece should not be limited to this. Examples of the workpiece usable herein include: gray iron; a heat-resistant alloy such as Inconel®; various types of steels; and the like.

In the cutting tool composed of the sintered material of each of samples A2 to A5, A10 to A13, A17 to A20, A23 to A26, A28 to A29, A32 to A33, A36 to A37, and A39 to A45, the first material is partially stabilized $ZrO_2$ in which 1 to 90 volume % of $Al_2O_3$ is dispersed in crystal grain boundaries or crystal grains, the second material is a carbide, 5 to 95 volume % of the second material is included in the sintered material, and the grain size of $Al_2O_3$ is less than or equal to 1 μm. As apparent from Table 1 and Table 2, each of these cutting tools had a small flank face wear amount upon the 3-km cutting and was therefore excellent in wear resistance, and also had an excellent chipping state upon the 10-km cutting and was therefore excellent in chipping resistance. Among the above-described cutting tools, the chipping states upon the 10-km cutting were particularly excellent in cutting tools in each of which the volume ratio, $ZrO_2/(ZrO_2+Al_2O_3)$, in the first material was more than or equal to 0.49.

In each of the cutting tools composed of the sintered materials of samples B2 to B5, B9 to B12, B15 to B16, B18 to B19, B22 to B23, and B25 to B30, the first material is partially stabilized $ZrO_2$ in which 1 to 90 volume % of $Al_2O_3$ is dispersed in crystal grain boundaries or crystal grains, the second material is a carbonitride, 5 to 95 volume % of the second material is included in the sintered material, and the grain size of $Al_2O_3$ is less than or equal to 1 μm. As apparent from Table 3, each of these cutting tools had a small flank face wear amount upon the 3-km cutting and was therefore excellent in wear resistance, and also had an excellent chipping state upon the 10-km cutting and was therefore excellent in chipping resistance. Among the above-described cutting tools, the chipping states upon the 10-km cutting were particularly excellent in cutting tools in each of which the volume ratio, $ZrO_2/(ZrO_2+Al_2O_3)$, in the first material was more than or equal to 0.49.

In the each of the cutting tools composed of the sintered materials of samples C2 to C5, C9 to C12, C15 to C18, C20 to C21, C24 to C25, and C27 to C32, the first material is partially stabilized $ZrO_2$ in which 1 to 90 volume % of $Al_2O_3$ is dispersed in crystal grain boundaries or crystal grains, the second material is a nitride, 5 to 95 volume % of the second material is included in the sintered material, and the grain size of $Al_2O_3$ is less than or equal to 1 μm. As apparent from Table 4, each of these cutting tools had a small flank face wear amount upon the 3-km cutting and was therefore excellent in wear resistance, and also had an excellent chipping state upon the 10-km cutting and was therefore excellent in chipping resistance. Among the above-described cutting tools, the chipping states upon the 10-km cutting were particularly excellent in cutting tools in each of which the volume ratio, $ZrO_2/(ZrO_2+Al_2O_3)$, in the first material was more than or equal to 0.49.

In each of the cutting tools composed of the sintered materials of samples D2 to D4, D6, D9 to D11, and D13, the first material is partially stabilized $ZrO_2$ in which 1 to 90 volume % of $Al_2O_3$ is dispersed in crystal grain boundaries or crystal grains, the second material is the two types of carbides, 5 to 95 volume % of the second material is included in the sintered material, and the grain size of $Al_2O_3$ is less than or equal to 1 μm. As apparent from Table 5, each of these cutting tools had a small flank face wear amount upon the 3-km cutting and was therefore excellent in wear resistance, and also had an excellent chipping state upon the 10-km cutting and was therefore excellent in chipping resistance. Among the above-described cutting tools, the chipping states upon the 10-km cutting were particularly excellent in cutting tools in each of which the volume ratio, $ZrO_2/(ZrO_2+Al_2O_3)$, in the first material was more than or equal to 0.49.

Heretofore, the embodiments and examples of the present invention have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A sintered material comprising a first material and a second material, wherein
  the first material is partially stabilized $ZrO_2$ in which 1 to 90 volume % of $Al_2O_3$ is dispersed in crystal grain boundaries or crystal grains,
  the $Al_2O_3$ is a grain having a grain size of more than or equal to 0.1 μm and less than or equal to 1 μm,
  the second material is at least one compound selected from a group consisting of a carbide, a nitride, and a carbonitride,
  the sintered material includes 30 to 80 volume % of the second material, and
  the sintered material includes 20 volume % or more of the first material.

2. The sintered material according to claim 1, wherein the compound includes at least one element selected from a group consisting of a group 4 element, a group 5 element, a group 6 element, and Si in a periodic table.

3. The sintered material according to claim 1, wherein a volume ratio, $ZrO_2/(ZrO_2+Al_2O_3)$, in the first material is more than or equal to 0.49.

4. The sintered material according to claim 1, wherein the sintered material further includes a third phase,
  the third phase includes at least one selected from a group consisting of aluminum oxide, magnesium oxide, cerium oxide, yttrium oxide, and hafnium oxide, and
  the sintered material includes less than or equal to 50 volume % of the third phase.

5. A cutting tool comprising the sintered material recited in claim 1.

6. The sintered material according to claim 1, wherein the first material is partially stabilized $ZrO_2$ in which 1 to 90 volume % of $Al_2O_3$ is dispersed in both of crystal grain boundaries and crystal grains.

* * * * *